United States Patent
Zeman et al.

(10) Patent No.: US 10,683,789 B2
(45) Date of Patent: Jun. 16, 2020

(54) DEVICE AND METHOD FOR OPERATING A HEATER FOR AN EXHAUST GAS PURIFICATION SYSTEM

(71) Applicant: Robert Bosch GmbH, Stuttgart (DE)

(72) Inventors: Petr Zeman, Stuttgart (DE); Florian Moldenhauer, Stuttgart-Feuerbach (DE); Horst Kleinknecht, Fichtenberg (DE); Marc Chaineux, Rudersberg (DE); Mathias Schwarz, Wendlingen am Neckar (DE); Till Broestl, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 15/887,257

(22) Filed: Feb. 2, 2018

(65) Prior Publication Data
US 2018/0223716 A1   Aug. 9, 2018

(30) Foreign Application Priority Data
Feb. 7, 2017   (DE) .................. 10 2017 201 867

(51) Int. Cl.
*G01K 7/00*   (2006.01)
*F01N 11/00*  (2006.01)
(Continued)

(52) U.S. Cl.
CPC .......... *F01N 11/005* (2013.01); *F01N 3/2013* (2013.01); *F01N 3/2066* (2013.01);
(Continued)

(58) Field of Classification Search
None
See application file for complete search history.

(56) References Cited

U.S. PATENT DOCUMENTS

| 8,348,498 B2 * | 1/2013 | Barcin | F02M 37/0082 374/1 |
| 2014/0227137 A1 * | 8/2014 | Iida | B01D 53/9431 422/111 |

(Continued)

FOREIGN PATENT DOCUMENTS

| DE | 102006040409 A1 | 3/2008 |
| DE | 102008047954 B3 | 3/2010 |

(Continued)

OTHER PUBLICATIONS

DE102008047954/EP2166327 translation (Year: 2010).*

*Primary Examiner* — Lisa M Caputo
*Assistant Examiner* — Nasir U. Ahmed
(74) *Attorney, Agent, or Firm* — Michael Best & Friedrich LLP

(57) ABSTRACT

A method is disclosed for determining a current temperature of a heating element with a PTC thermistor property (PTC) with which a urea-water solution for cleaning the exhaust gas in an internal combustion engine of nitrogen oxides can be heated.

According to the invention there is provision that a correction factor is formed from the quotient of a minimum resistance of the heating element and of a minimum resistance of a reference heating element, in that a resistance which is determined at a current temperature of the heating element is multiplied by the correction factor, and in that the current temperature of the heating element is determined from the corrected resistance value and a temperature dependence of the resistance of the reference heating element.

The method according to the invention permits more precise determination and regulation of the temperature of the heating element.

16 Claims, 2 Drawing Sheets

(51) Int. Cl.
  *F01N 3/20* (2006.01)
  *G01K 7/18* (2006.01)
  *G01K 7/42* (2006.01)
  *G01K 7/22* (2006.01)
  *G01K 15/00* (2006.01)

(52) U.S. Cl.
  CPC ............ *G01K 7/183* (2013.01); *G01K 7/22* (2013.01); *G01K 7/425* (2013.01); *G01K 15/005* (2013.01); *F01N 2610/02* (2013.01); *F01N 2610/105* (2013.01); *F01N 2900/0422* (2013.01); *F01N 2900/1811* (2013.01); *G01K 2205/00* (2013.01); *G01K 2217/00* (2013.01); *Y02T 10/24* (2013.01)

(56) References Cited

U.S. PATENT DOCUMENTS

2016/0186633 A1    6/2016  Müller et al.
2018/0066561 A1*   3/2018  Nakada .................... F01N 3/36

FOREIGN PATENT DOCUMENTS

| DE | 102008044271 A1 | 6/2010 |
| DE | 102010038361    | 1/2012 |
| DE | 102012110985    | 6/2014 |
| DE | 102013108501    | 3/2015 |
| EP | 1321751 A1      | 6/2003 |

* cited by examiner

DEVICE AND METHOD FOR OPERATING A HEATER FOR AN EXHAUST GAS PURIFICATION SYSTEM

BACKGROUND OF THE INVENTION

The invention relates to a method for determining a current temperature of a heating element with a PTC thermistor property (PTC) with which a urea-water solution for cleaning the exhaust gas of an internal combustion engine of nitrogen oxides can be heated.

The invention also relates to a device for determining a current temperature of a heating element with a PTC thermistor property (PTC) which heats the urea-water solution in order to clean the exhaust gas of an internal combustion engine of nitrogen oxides, and wherein a temperature dependence of the resistance of a reference heating element is stored in a control unit.

Exhaust gas purification systems for denitrifying the exhaust gas of an internal combustion engine utilize a urea-water solution which is metered into the exhaust gas upstream of a catalytic convertor for selective catalytic reduction (SCR catalytic convertor). The urea-water solution ("Ad-Blue") freezes at a temperature of −11° C. and must therefore be heated up under cold ambient conditions. A freezing solution expands and can therefore damage the metering system. Furthermore, the solution cannot be metered and the exhaust gas would contain unacceptably high values of nitrogen oxide. Because of the intrinsic safety of a heating element with a PTC thermistor characteristic (PTC-positive temperature coefficient-heater), such a heating element is used to heat the urea-water solution. The resistance of the heating element rises strongly with the temperature starting from a material-dependent switching temperature, and reduces the heating power in the case of a constant operation voltage, with the result that the switching temperature essentially cannot be exceeded. Depending on the necessary heating power, the heating element can be composed of a plurality of PTC heating elements connected in parallel. Even in the case of a heating element which is not covered by a urea-water solution, the PTC characteristic prevents the heating element heating up too strongly as result of the reduced dissipation of heat. In order to thaw the urea-water solution, a much lower temperature is necessary than the switching temperature of the PTC heating element. It is therefore desirable to bring about regulation and limitation of the temperature of the heating element and of the urea-water solution without an additional temperature sensor.

Document DE 10 2013 108 501 A1 describes methods for manufacturing a conveyor module with an electronic PTC heater, for installation in a liquid tank and for storing a liquid additive, having at least the following steps:
a) defining a maximum electrical power which is made available to the conveyor module,
b) defining a thermal conductivity of the conveyor module of a location of the electrical PTC heater in the liquid tank,
c) calculating a switching temperature of the PTC heater from the maximum electrical power and the thermal conductivity, and
d) mounting a PTC material with a corresponding switching temperature for the PTC heater at the location.

In document DE 10 2013 108 501 A1 a working temperature of a PTC heating element, which is reached at a predefined, desired heating power, is determined. A PTC material with a switching temperature which corresponds to the working temperature is selected as the material for the heating element. As a result, the power which is taken up by the heater is limited to the desired value.

Document DE 10 2012 110 985 B4 discloses a method for determining a temperature range for a reducing agent which is located in a liquid tank for an exhaust gas post-treatment system of a motor vehicle with an internal combustion engine, which method comprises the following method steps:
a) sensing a temperature (TT) of the liquid tank,
b) sensing an ambient temperature (TU) of the motor vehicle,
c) sensing the difference between the temperature (TD) of the liquid tank and the ambient temperature of the motor vehicle,
d) defining a temperature (TR) of the reducing agent which is located in the liquid tank, on the basis of the temperature sensed in steps a) to c), and
e) storing the temperatures sensed or defined in the steps a) to d) and
f) repeating the steps a) to e) after a predefined time period.

The temperature of the reducing agent is determined for its optimum metering for exhaust gas post-treatment.

Document DE 10 2010 038 361 A1 discloses a method for measuring the temperature of a medium, wherein the medium is in contact with at least one heating device (18), and the heating device (18) has at least one PTC element, comprising the following method steps:
sensing at least one variable which characterizes the current and/or the voltage and/or the resistance at the PTC element during the operation of the heating device (18),
forming at least one conductance value from the sensed values,
forming at least one predictor (100; 200) from the conductance value which is dependent on time, and
evaluating the at least one predictor (100; 200) in order to infer the temperature of the medium.

In the document it is mentioned that the temperature of the medium surrounding the heating device can be inferred from the conductance value of the heating device. Therefore, the temperature of the heating device can also be inferred from the resistance, said temperature largely corresponding to the temperature of the surrounding medium.

Heating elements with a PTC characteristic are, however, subject to fabrication tolerances, as result of which the relationship of their resistance and their temperature is also subject to tolerances.

SUMMARY OF THE INVENTION

The object of the invention is therefore to provide a method and a device for more precise regulation and limitation of the temperature of a heating element (22*a*) in a heating device (22) for a liquid for denitrifying the exhaust gas of an internal combustion engine.

The object of the invention relating to the method is achieved in that a correction factor is formed from the quotient of a minimum resistance of the heating element (22*a*) and of a minimum resistance of a reference heating element, in that a resistance which is determined at a current temperature of the heating element (22*a*) is multiplied by the correction factor, and in that the current temperature of the heating element (22*a*) is determined from the corrected resistance value and the temperature dependence of the resistance of the reference heating element. As a result of the correction of the influence of fabrication variations on the resistance of the heating element (22*a*), the current temperature of the heating element (22*a*) can be determined more precisely. Regulation and limitation of the current temperature of the heating element (22a) can therefore be improved. The current temperature of the heating element (22a) can be limited and regulated not only to the switching temperature of the PTC heating element (22a) but also to another relatively low temperature.

If a cable resistance of the feed cables (22b) is subtracted during the determination of the resistance of the heating element (22a), the resistance of the heating element (22a) and therefore the current temperature of the heating element (22a) can be determined more precisely. The PTC heating element (22a) has comparatively low impedance, with the result that the cable resistance of the feed cables (22b) can falsify the true value of the resistance of the heating element (22a).

The object of the invention relating to the device is achieved in that the circuit (21a) or a program sequence for determining a correction factor from the quotient of a minimum resistance of the heating element (22a) and a minimum resistance of the reference heating element is present in the control unit (21), for the purpose of multiplying a resistance determined at a current temperature of the heating element (22a) by the correction factor, and of determining the current temperature of the heating element (22a) from the corrected resistance value and the temperature dependence of the resistance of the reference heating element. If the control unit (21) regulates and/or limits the current temperature of the heating element (22a) to a lower value than its switching temperature, the service life of the heating element (22a) can be improved. Also, a rise in temperature of the heating element (22a) can be avoided even in the event of the heating element (22a) not being covered with the urea-water solution.

BRIEF DESCRIPTION OF THE DRAWINGS

The invention is explained in more detail below on the basis of an exemplary embodiment which is illustrated in the figure. In the drawing.

DETAILED DESCRIPTION

Figure 1:
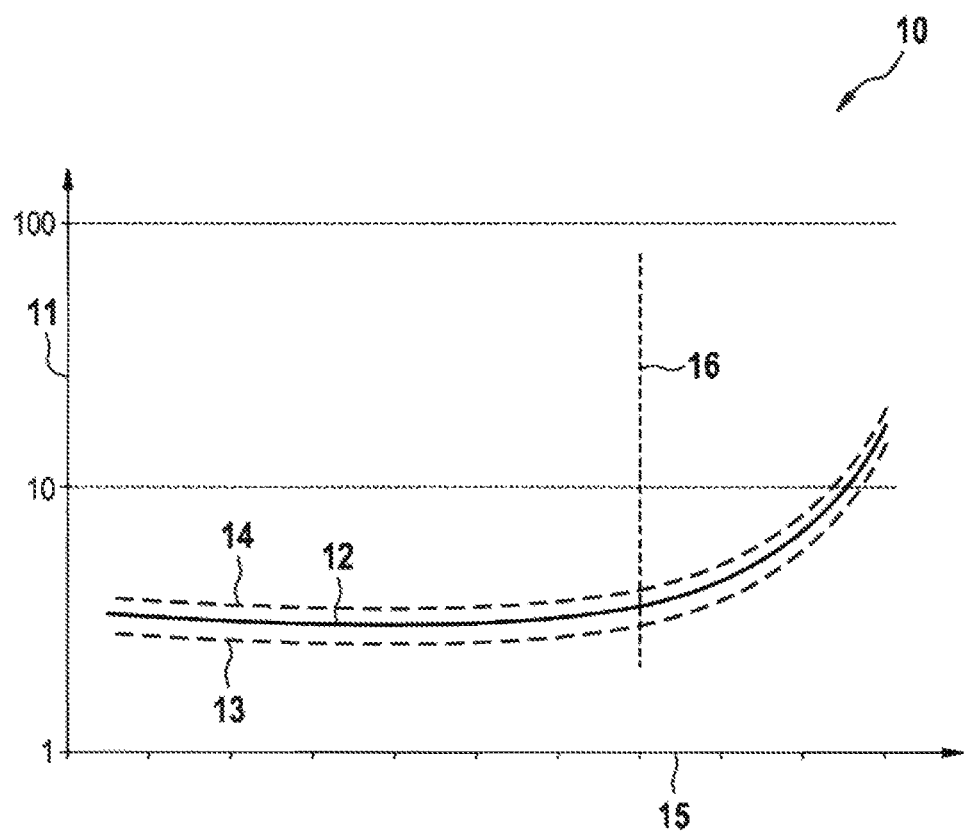
FIG. 1 shows a resistance diagram for a PTC heating element.

FIG. 1 shows a resistance diagram (10) for a heating element (22a) which is heated with a PTC (Positive Temperature Coefficient) thermistor for a urea-water solution for denitrifying the exhaust gas of an internal combustion engine. Such a heating element (22a) is necessary since the urea-water solution freezes at −11° C. and can then no longer be metered into the exhaust gas duct. Furthermore, freezing urea-water solution expands and can damage the metering system. A resistance curve (12) of the PTC heating element (22a) is input into the resistance diagram (10) along a resistance axis (11) and a temperature axis (15). The resistance is plotted logarithmically along the resistance axis (11). At low temperatures, the resistance is low and rises strongly starting from a switching temperature (16). The switching temperature (16) is dependent on the material of the PTC. As result of the rise in the resistance starting from the switching temperature (16), the heating power decreases, given a constant operating voltage of the heating element (22a), with the result that a temperature in the region of the switching temperature (16) comes about. Owing to fabrication tolerances, the resistance curve of a real heating element from a series production lies in the range between a lower tolerance band (13) and an upper tolerance band (14). The resistance curve (12) therefore represents the temperature dependence of the resistance of a reference heating element. The temperature which occurs when the system is in equilibrium is also subject to tolerances when considering series production, and lies in a tolerance range around the switching temperature (16).

Figure 2:
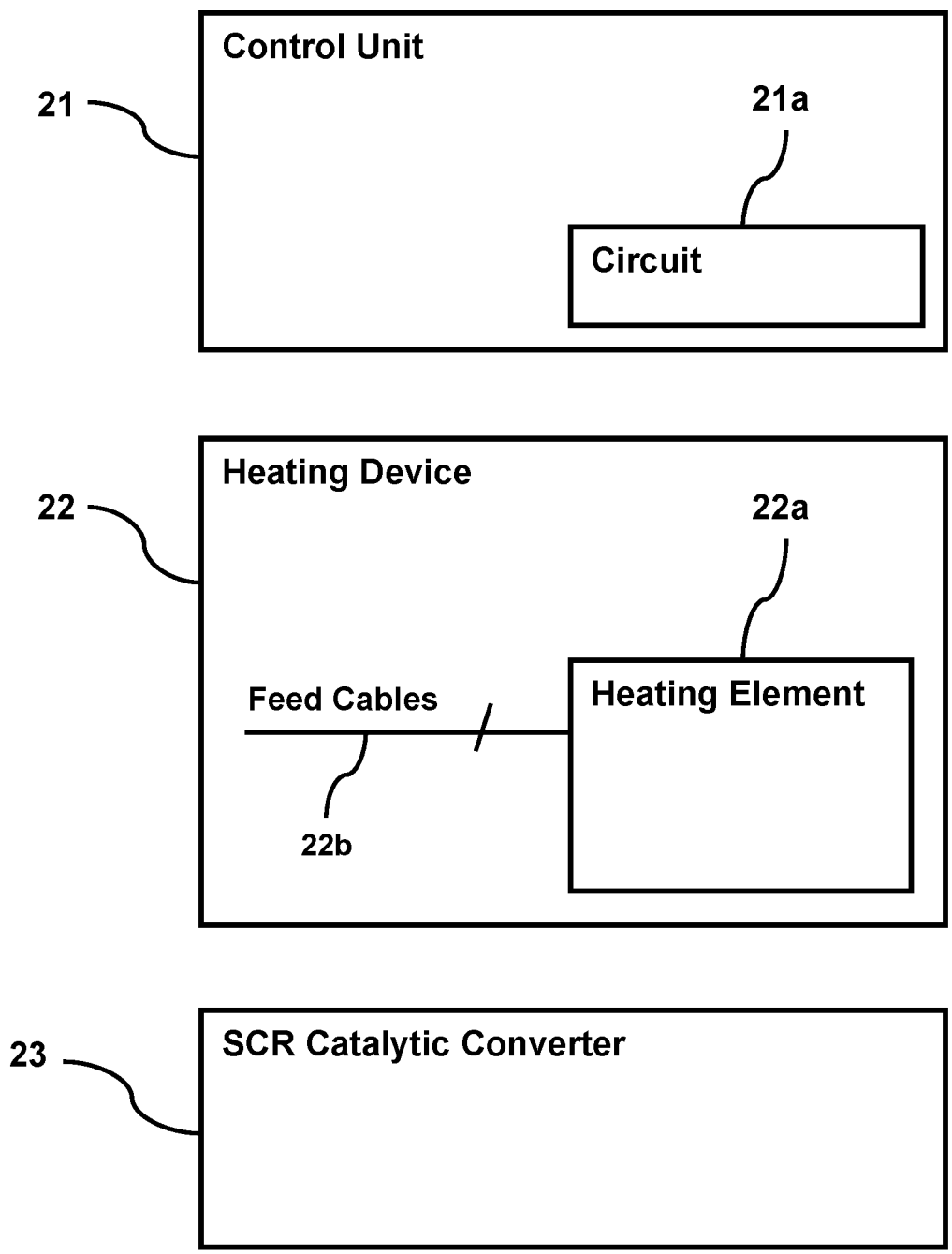
FIG. 2 shows a diagram for a control unit, heater device and SCR catalytic convertor.

FIG. 2 shows a diagram for the control unit (21), the heater device (22) and the SCR catalytic convertor (23). During operation of the heating device (22) for a denitrifying system, a much lower temperature than the switching temperature (16) is sufficient. Therefore, the resistance of the heating element (22a) is determined, and a current temperature of the heating element (22a) is determined therefrom. During the thawing and heating of the urea-water solution, a maximum possible heating power can then be output, which power ensures reliable operation as long as the current temperature of the heating element (22a) does not exceed a maximum permissible temperature. Owing to the fabrication tolerances, the determination of the temperature is provided with tolerances. According to the invention there is therefore provision to determine the minimum resistance value $R_{min,HE}$ for the individual heating element (22a) which is installed in the system, and related to the minimum resistance value $R_{min,Ku}$ for a reference heating element from the resistance curve (12). The correction factor $$K = R_{min,HE}/R_{min,Ref}$$

which is formed in this way is used to correct the resistance values which are determined at the individual heating element (22a). As a result this improves the determination of the current temperature of the heating element (22a) and therefore also the regulation and limitation of the current temperature of the heating element (22a).

The invention claimed is:

1. A device for determining a current temperature of a PTC heating element wherein the PTC heating element is configured to heat a urea-water solution, the device comprising:
   a control unit comprising a circuit that permits the control unit to regulate, while the urea-water solution is metered into an exhaust gas upstream of a selective catalytic reduction catalytic convertor, the current temperature of the PTC heating element,
   wherein to determine the current temperature of the PTC heating element, the circuit:
      stores, as a stored temperature dependence of a reference heating element, a temperature dependence of a resistance of the reference heating element,
      determines, while the PTC heating element is at the current temperature of the PTC heating element, a resistance of the PTC heating element,
      determines, so as to obtain as a correction factor, a quotient of a minimum resistance of the PTC heating element and a minimum resistance of the reference heating element,
      multiplies, so as to obtain a corrected resistance value, the correction factor times the resistance of the PTC heating element, and
      determines, from the corrected resistance value and the stored temperature dependence, the current temperature of the PTC heating element.

2. The device according to claim 1, wherein the circuit subtracts a cable resistance of feed cables when the circuit determines the resistance of the PTC heating element.

3. The device according to claim 1, wherein the selective catalytic reduction catalytic convertor is in an internal combustion engine.

4. The device according to claim 3, wherein the urea-water solution is configured to clean the exhaust gas in the internal combustion engine of nitrogen oxides.

5. The device according to claim 1, wherein the PTC heating element comprises a plurality of heating elements.

6. The device according to claim 5, wherein the plurality of heating elements is connected in parallel.

7. The device according to claim 1, wherein a resistance curve of the PTC heating element represents the temperature dependence.

8. The device according to claim 1, wherein the PTC heating element has a positive temperature coefficient thermistor property.

9. A method for determining a current temperature of a PTC heating element, the method comprising:
- storing, by a control unit as a stored temperature dependence of a reference heating element, a temperature dependence of a resistance of the reference heating element;
- determining, by a circuit in the control unit while the PTC heating element is at the current temperature of the PTC heating element, a resistance of the PTC heating element;
- determining, by the circuit so as to obtain as a correction factor, a quotient of a minimum resistance of the PTC heating element and a minimum resistance of the reference heating element;
- multiplying, by the circuit so as to obtain a corrected resistance value, the correction factor times the resistance of the PTC heating element;
- determining, by the circuit from the corrected resistance value and the stored temperature dependence, the current temperature of the PTC heating element; and
- regulating, by the control unit while a urea-water solution is metered into an exhaust gas upstream of a selective catalytic reduction catalytic convertor, the current temperature of the PTC heating element,
wherein the PTC heating element heats the urea-water solution.

10. The method according to claim 9, wherein the circuit subtracts a cable resistance of feed cables when the circuit determines the resistance of the PTC heating element.

11. The method according to claim 9, wherein the selective catalytic reduction catalytic convertor is in an internal combustion engine.

12. The method according to claim 11, wherein the urea-water solution cleans the exhaust gas in the internal combustion engine of nitrogen oxides.

13. The method according to claim 9, wherein the PTC heating element comprises a plurality of heating elements.

14. The method according to claim 13, wherein the plurality of heating elements is connected in parallel.

15. The method according to claim 9, wherein a resistance curve of the PTC heating element represents the temperature dependence.

16. The method according to claim 9, wherein the PTC heating element has a positive temperature coefficient thermistor property.

* * * * *